(12) United States Patent
Cours et al.

(10) Patent No.: US 10,136,584 B1
(45) Date of Patent: Nov. 27, 2018

(54) DUAL RECIPROCATING BLADE LANDSCAPE SAW WITH ENHANCED DURABILITY AND PERFORMANCE

(71) Applicants: George Larry Cours, Freeport, TX (US); John Smircic, Richwood, TX (US)

(72) Inventors: George Larry Cours, Freeport, TX (US); John Smircic, Richwood, TX (US)

( * ) Notice: Subject to any disclaimer, the term of this patent is extended or adjusted under 35 U.S.C. 154(b) by 90 days.

(21) Appl. No.: 15/497,999

(22) Filed: Apr. 26, 2017

(51) Int. Cl.
| | |
|---|---|
| *B26B 19/02* | (2006.01) |
| *A01G 3/08* | (2006.01) |
| *A01G 3/06* | (2006.01) |
| *F16H 3/68* | (2006.01) |
| *F16H 1/30* | (2006.01) |
| *B26B 19/06* | (2006.01) |
| *F16H 57/021* | (2012.01) |

(52) U.S. Cl.
CPC ............. *A01G 3/085* (2013.01); *A01G 3/06* (2013.01); *A01G 3/062* (2013.01); *A01G 3/067* (2013.01); *F16H 1/30* (2013.01); *F16H 3/68* (2013.01); *B26B 19/02* (2013.01); *B26B 19/06* (2013.01); *F16H 2057/0213* (2013.01)

(58) Field of Classification Search
CPC ...... F16H 1/30; F16H 3/68; F16H 2057/0213; A01G 3/085
See application file for complete search history.

(56) References Cited

U.S. PATENT DOCUMENTS

| | | | | | |
|---|---|---|---|---|---|
| 1,564,318 | A | * | 12/1925 | Bower | F16H 3/68 475/304 |
| 1,763,865 | A | * | 6/1930 | Rocke | F16H 1/16 100/162 R |
| 2,294,356 | A | * | 8/1942 | Lawson | F16H 3/68 475/254 |
| 4,280,276 | A | | 7/1981 | Comer | |
| 7,757,405 | B2 | * | 7/2010 | Peterson | A01G 3/053 30/216 |
| 7,950,318 | B2 | | 5/2011 | Ericsson | |
| 8,028,423 | B2 | * | 10/2011 | Matsuo | A01G 3/053 30/216 |
| 8,397,389 | B2 | * | 3/2013 | Geromiller | A01G 3/053 30/208 |
| 8,918,998 | B2 | * | 12/2014 | Heinzelmann | A01G 3/053 30/208 |

(Continued)

*Primary Examiner* — Sean Michalski
(74) *Attorney, Agent, or Firm* — Plager Schack LLP; Mark H. Plager; Eric Liou

(57) ABSTRACT

A dual reciprocating blade landscape saw is operably connected to a rotatable shaft of an input device. The landscape saw includes a worm assembly having a lower housing and a worm disposed therein, the worm operably connected to the rotatable shaft of the input device and having a spiral thread, a worm gear assembly having an upper housing and a worm gear disposed therein, the worm gear having a disk comprising a cutout and a plurality of outer teeth engaged with the spiral thread of the worm, and a pair of blades coupled to opposing sides of the worm gear. The rotatable shaft of the input device drives the worm of the worm assembly. Rotational motion of the worm transfers to the worm gear to permit the pair of blades coupled thereon to move linearly in a reciprocating sequence.

10 Claims, 5 Drawing Sheets

(56) References Cited

U.S. PATENT DOCUMENTS

| | | | | |
|---|---|---|---|---|
| 2003/0213603 | A1* | 11/2003 | Fisher | A01G 3/08 173/170 |
| 2005/0115080 | A1* | 6/2005 | Sasaki | A01G 3/053 30/210 |
| 2011/0179651 | A1* | 7/2011 | Hittmann | A01G 3/053 30/216 |
| 2012/0036722 | A1* | 2/2012 | Hittmann | A01G 3/053 30/216 |
| 2012/0151778 | A1* | 6/2012 | Svennung | A01G 3/053 30/216 |
| 2012/0167394 | A1* | 7/2012 | Lugert | A01G 3/053 30/216 |
| 2012/0174416 | A1* | 7/2012 | Nelson, II | A01G 3/085 30/276 |
| 2013/0125404 | A1* | 5/2013 | Nikas | A01G 3/085 30/210 |
| 2014/0007433 | A1* | 1/2014 | Kochi | B23D 17/04 30/228 |
| 2014/0190023 | A1* | 7/2014 | Vitantonio | B23D 51/16 30/369 |
| 2015/0283714 | A1* | 10/2015 | Sandefur | B26B 15/00 30/210 |
| 2016/0007542 | A1* | 1/2016 | Stones | A01G 3/053 30/216 |
| 2018/0216720 | A1* | 8/2018 | Kim | F16H 57/039 |

* cited by examiner

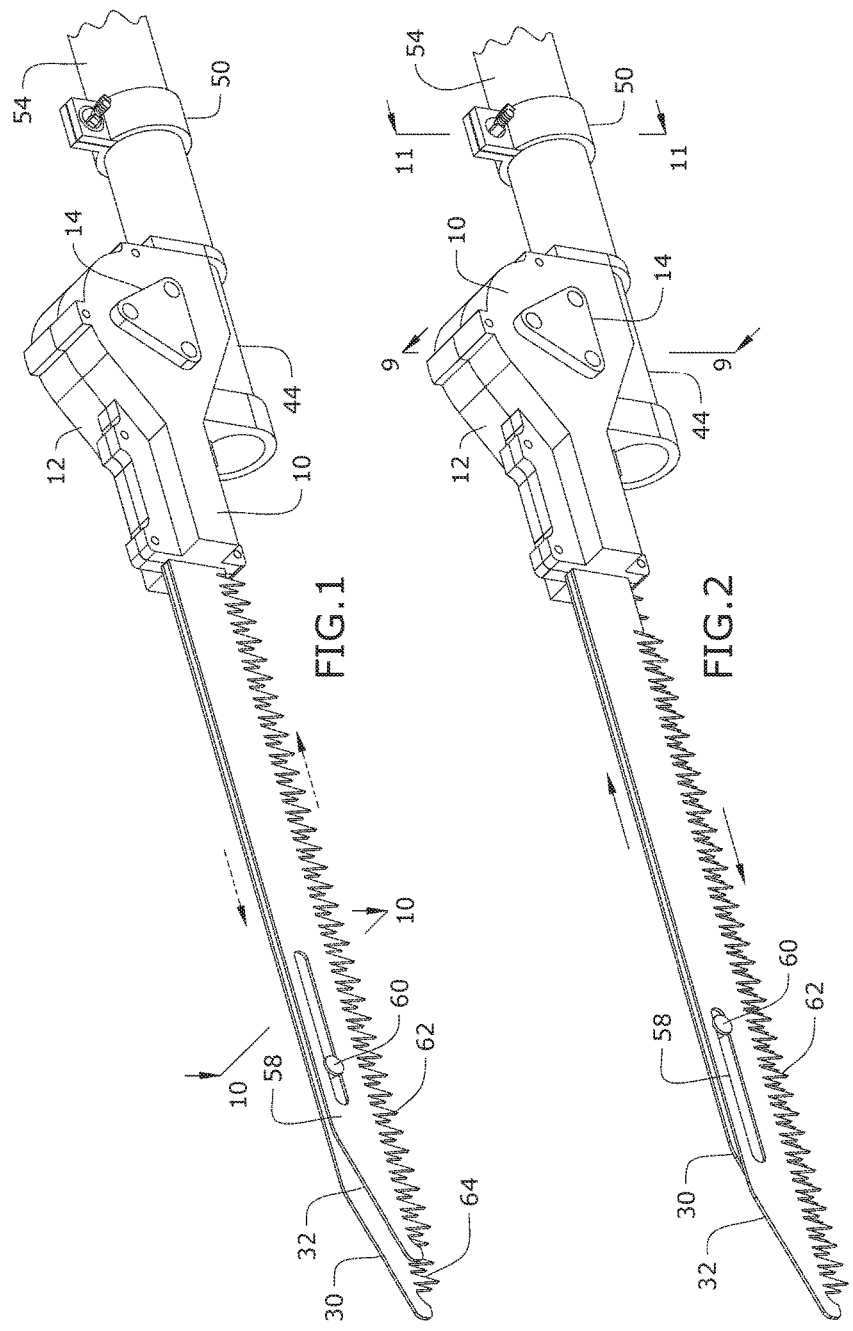

DUAL RECIPROCATING BLADE LANDSCAPE SAW WITH ENHANCED DURABILITY AND PERFORMANCE

BACKGROUND

The embodiments herein relate generally to landscape saws.

Landscape tools such as saws, trimmers, cutters and the like, are used to cut overgrown vines, branches, twigs and other vegetation located on a property. In many instances, multiple tools are required to perform work on a property due to the various types and thicknesses of vegetation present. For example, a string trimmer is not designed to cut thick vines or sapling, a hedge trimmer is not configured to cut saplings, and a chainsaw is not configured to cut thin vines. Carrying multiple tools at the same time and switching between them while performing work is inefficient and a burden on the user.

There exists a variety of multiple blade cutting devices as disclosed in U.S. Pat. Nos. 7,950,318 and 4,280,276, and U.S. Patent Application Publication 2014/0190023. These devices are designed to improve blade cutting performance, but have several limitations. In particular, these devices require the use of many complex and/or bulky components that can be difficult to use.

As such, there is a need in the industry for a dual reciprocating blade landscape saw that addresses the limitations of the prior art, which enhances durability and cutting performance. There is a further need for a landscape saw design with reduced weight that minimizes energy consumption and vibration of components when in use.

SUMMARY

A dual reciprocating blade landscape saw with enhanced performance and reduced vibrations when in use is provided. The landscape saw is operably connected to a rotatable shaft of an input device. The landscape saw comprises a worm assembly comprising a lower housing and a worm disposed therein, the worm operably connected to the rotatable shaft of the input device and comprising a spiral thread, a worm gear assembly operably connected to the worm assembly and comprising an upper housing and a worm gear disposed therein, the worm gear comprising a disk comprising a cutout and a plurality of outer teeth engaged with the spiral thread of the worm, the cutout comprising a pair of flared portions that extend from a central portion of the worm gear to an edge of the worm gear to reduce rotational mass, and a pair of blades coupled to opposing sides of the worm gear, wherein the rotatable shaft of the input device is configured to drive the worm of the worm assembly, wherein rotational motion of the worm transfers to the worm gear to permit the pair of blades coupled thereon to move linearly in a reciprocating sequence.

BRIEF DESCRIPTION OF THE FIGURES

The detailed description of some embodiments of the invention will be made below with reference to the accompanying figures, wherein the figures disclose one or more embodiments of the present invention.

FIG. 1 depicts a perspective view of certain embodiments of the landscape saw shown in use in an exemplary initial configuration;

FIG. 2 depicts a perspective view of certain embodiments of the landscape saw shown in use in an exemplary secondary configuration;

DETAILED DESCRIPTION OF CERTAIN EMBODIMENTS

Figure 7:
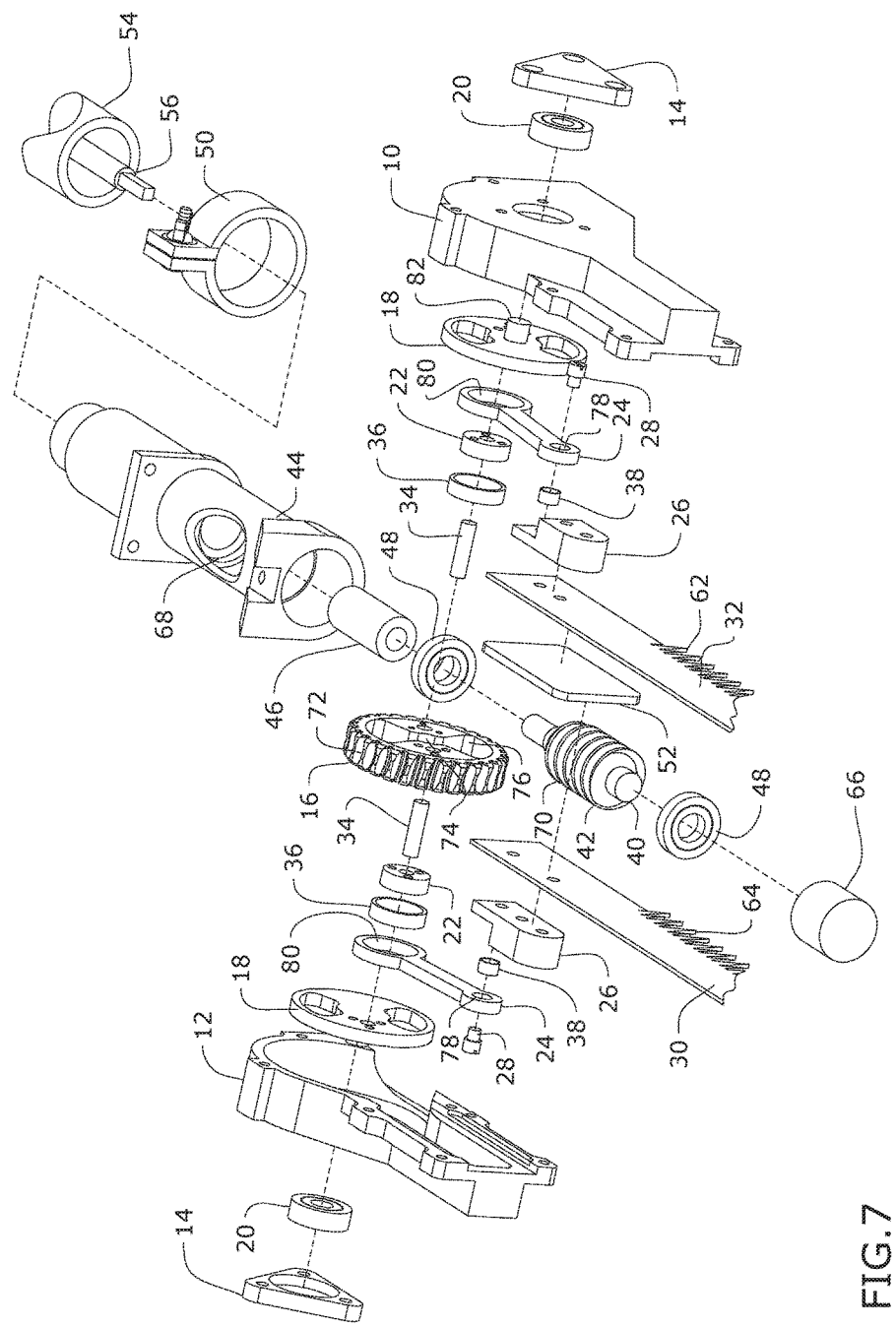
FIG. 7 depicts an exploded view of certain embodiments of the landscape saw.

As depicted in FIGS. 1-2 and 7, the dual blade landscape saw is configured for use with an input device and comprises a pair of reciprocating blades. The input device serves as a power source to drive the landscape saw and may comprise a variety of devices including, but not limited to, a weed eater, grass trimmer, or the like. In certain embodiments, the input device comprises input device shaft housing 54 and input device rotatable shaft 56. The input device may be powered by gasoline, electric outlet or one or more batteries depending on the type of motor used.

In certain embodiments, the landscape saw is preferably made from a variety of materials including, but not limited to, steel, aluminum, brass, iron, or other metals and/or alloys known in the field. In certain embodiments, the landscape saw generally comprises an upper housing comprising right housing 10, left housing 12, a lower housing comprising worm housing 44, left blade 30 and right blade 32. Left and right blades 30, 32 may have variable dimensions and comprise left blade teeth 64 and right blade teeth 62. In certain embodiments, the landscape saw comprises a worm assembly comprising worm shaft 40, worm 42, worm housing 44, adaptor 46 and worm bearings 48. In certain embodiments, the landscape saw comprises a worm gear assembly comprising worm gear 16, journal pins 34, journal bushings 36, bearing journals 22, connecting rods 24 and bearing carriers 18.

Figure 9:
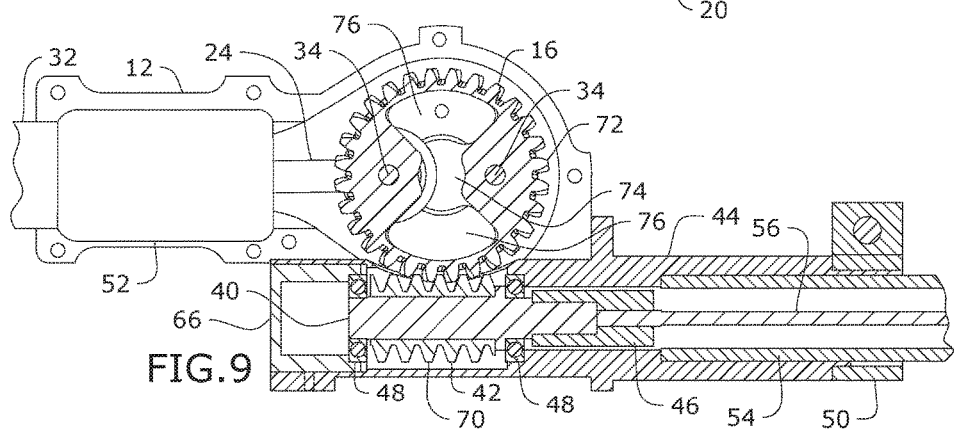
FIG. 9 depicts a section view of certain embodiments of the landscape saw taken along line 9-9 in FIG. 2.

As depicted in FIGS. 7 and 9, worm housing 44 comprises upper opening 68 and is configured to house worm shaft 40, worm 42, worm bearings 48 and adapter 46. Worm shaft 40 and worm 42 are preferably a single and continuous component comprising spiral thread 70. Worm shaft 40 extends through the center of worm 42 along a longitudinal axis of the worm. A pair of worm bearings 48 are disposed around worm shaft 40 on opposing ends of worm 42. Adaptor 46 is disposed around worm shaft 40 and secured in place by a pin (not shown). Adaptor 46 comprises a female end configured to engage with a male end of input device rotatable shaft 56. This connection permits input device rotatable shaft 56 to drive worm shaft 40, thereby permitting the rotation of worm 42.

Figure 11:
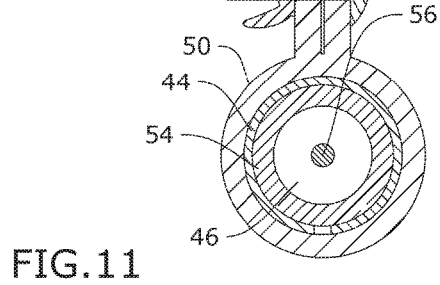
FIG. 11 depicts a section view of certain embodiments of the landscape saw taken along line 11-11 in FIG. 2.

As depicted in FIGS. 9 and 11, input device shaft housing 54 is coupled to worm housing 44 by clamp 50. Plug 66 is disposed within worm housing 44 on the other side and secured in place by a set screw. In this secured position, plug 66 contacts worm bearing 48 and maintains worm 42 in place during use. Plug 66 also seals worm housing 44 and prevents the entrance of dirt or other debris therein.

Figure 8:
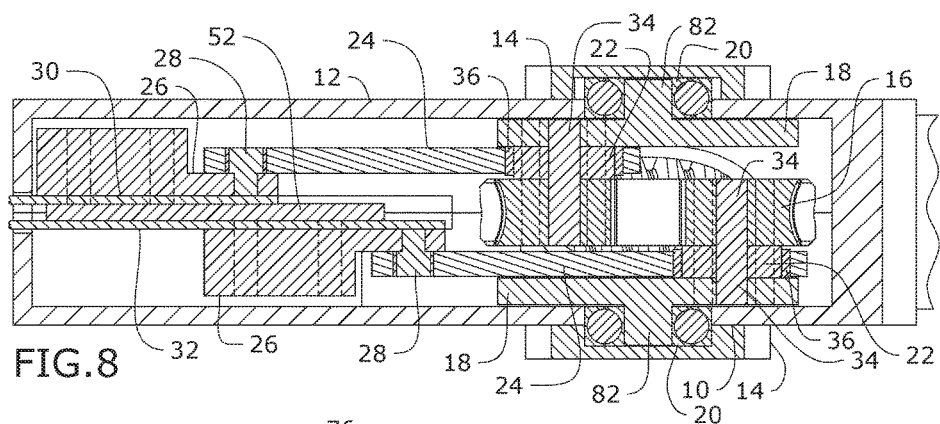
FIG. 8 depicts a section view of certain embodiments of the landscape saw taken along line 8-8 in FIG. 3.

As depicted in FIGS. 7-8, worm gear 16 comprises a disk with cutout 74 and outer teeth 72 configured to engage with spiral thread 70 of worm 42. Cutout 74 of worm gear 16 comprises a central portion connected to a pair of flared cutout portions 76. Flared cutout portions 76 extend toward the edge of worm gear 16. Cutout 74 reduces the rotational mass of worm gear 16 to enhance operational efficiency and reduce power usage.

Connecting rods 24 are coupled to left and right blades 30, 32 and opposing sides of worm gear 16. Each connecting rod 24 is coupled to both a blade and worm gear 16 in the same manner. Each connecting rod 24 comprises small opening 78 and large opening 80. Large opening 80 of connecting rod 24 is configured to receive bearing journal 22 and journal bushing 36. Bearing journal 22 is coupled to both worm gear 16 and bearing carrier 18 by journal pin 34 and mechanical fasteners such as flathead screws (not shown). Each bearing carrier 18 comprises protrusion 82 that extends through worm gear bearing 20. Protrusion 82 and worm gear bearing 20 remain flush with each other and extend through either right housing 10 or left housing 12. Bearing cap 14 is disposed over each worm gear bearing 20 and coupled to either right housing 10 or left housing 12 by mechanical fasteners such as flathead screws (not shown). This permits bearing caps 14 to enclose worm gear bearings 20 extending through right and left housings 10, 12. Right and left housings 10, 12 are coupled together by mechanical fasteners.

Each blade of left and right blades 30, 32 is coupled to blade carrier 26 by mechanical fasteners such as flathead screws. Each blade carrier 26 is coupled to small opening 78 of connecting rod 24 by wrist pin 28 and blade carrier bushing 38. This configuration connects left and right blades 30, 32 to worm gear 16 via connecting rods 24.

Figure 10:
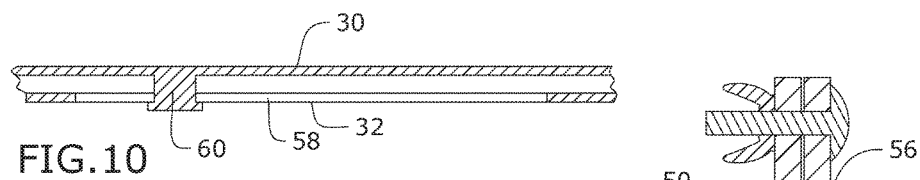
FIG. 10 depicts a section view of certain embodiments of the landscape saw taken along line 10-10 in FIG. 1.

As depicted in FIGS. 7-9, blade shim plate 52 is disposed between left and right blades 30, 32 within right and left housings 10, 12 to prevent the blades from contacting each other. In addition, left and right blades 30, 32 are separated from each other by blade pin 60 of left blade 30 as depicted in FIGS. 1-2 and 10. Blade pin 60 extends through blade slot 58 of right blade 32. As left and right blades 30, 32 slide linearly relative to each other, blade pin 60 of left blade 30 slides along blade slot 58 of right blade 32.

Figure 3:
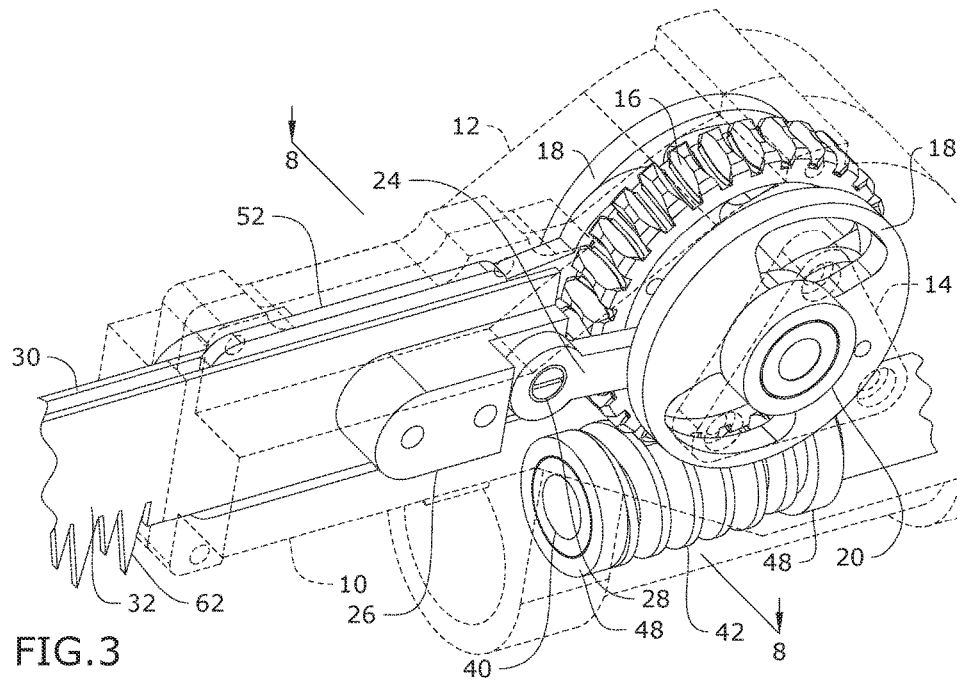
FIG. 3 depicts a perspective view of certain embodiments of the landscape saw in the exemplary initial configuration with certain outer casing components shown hidden to demonstrate internal components.
Figure 4:
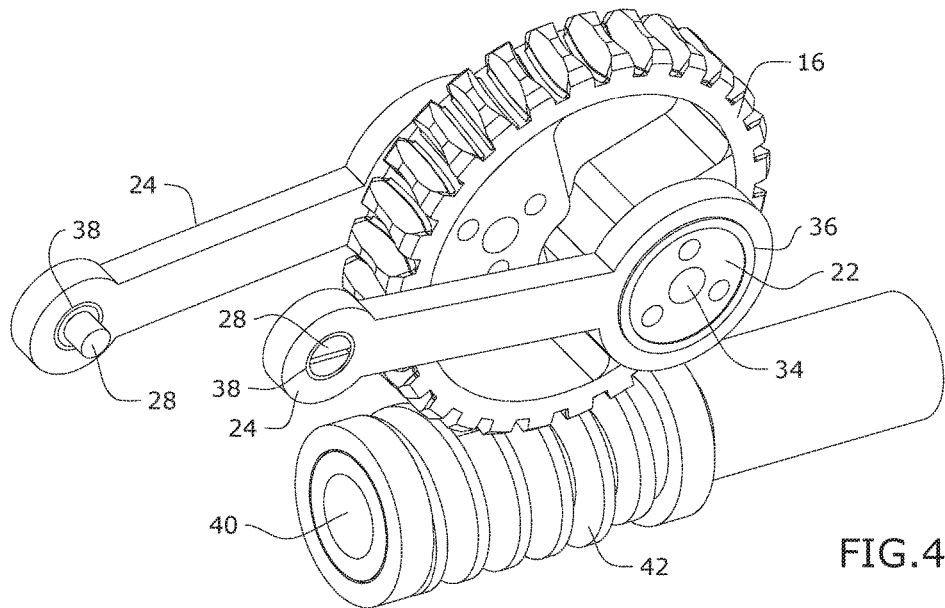
FIG. 4 depicts a perspective view of certain embodiments of the landscape saw in the exemplary initial configuration showing only select primary internal components.
Figure 5:
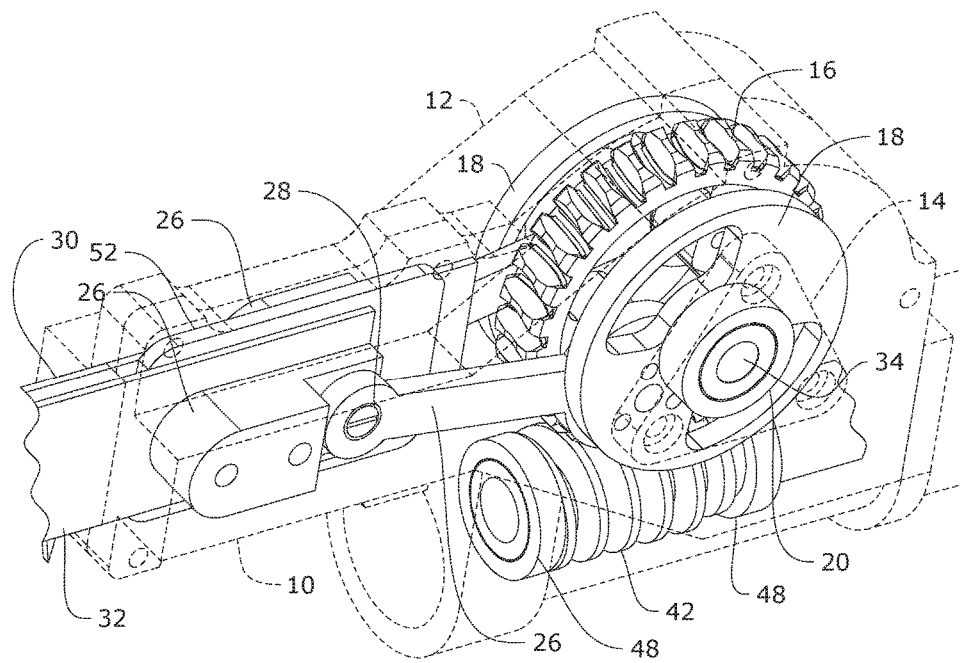
FIG. 5 depicts a perspective view of certain embodiments of the landscape saw in the exemplary secondary configuration with certain outer casing components shown hidden to demonstrate internal components.
Figure 6:
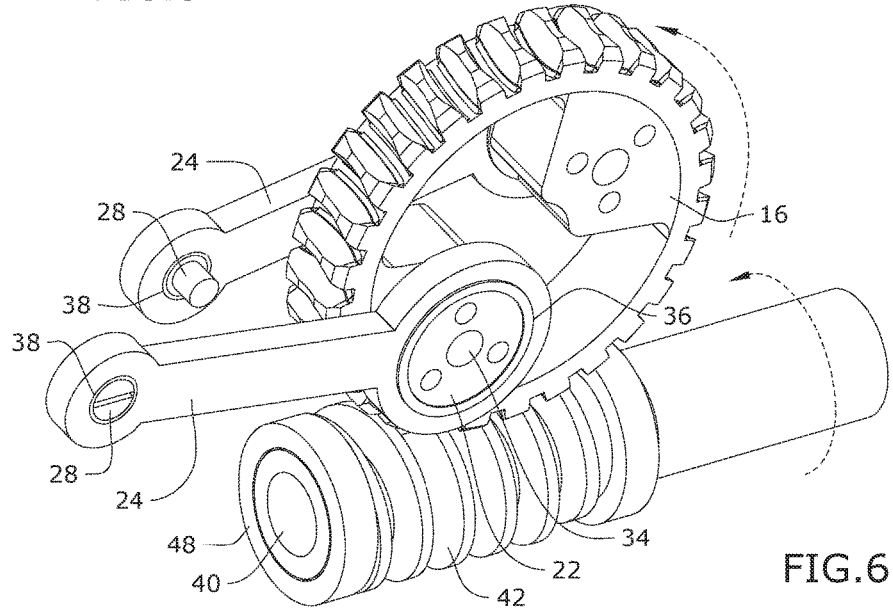
FIG. 6 depicts a perspective view of certain embodiments of the landscape saw in the exemplary secondary configuration showing only select primary internal components.

In operation, the landscape saw is connected to input device rotatable shaft 56 and input device shaft housing 54 as described before. The input device is enabled to drive input device rotatable shaft 56. The rotation of rotatable shaft 56 drives worm shaft 40, which rotates worm 42. The engagement of outer teeth 72 of worm gear 16 with spiral thread 70 of worm 42 causes the rotation of worm 42 to rotate worm gear 16. Connecting rods 24 permit the rotational motion of worm gear 16 to transfer to the linear reciprocating motion of left and right blades 30, 32 as depicted in FIGS. 1-2. FIGS. 1 and 3-4 depict a snapshot of the landscape saw in motion in an initial configuration. FIGS. 2 and 5-6 depict a snapshot of the landscape saw in motion in a secondary configuration.

In certain embodiments, the landscape saw can be used differently to best accommodate the user. For example, the shaft of the input device may be varied to permit the landscape saw to be used like a string trimmer or tree saw. The landscape saw can be used close to the user's body like a chainsaw or away from the body in an extended position to reach into trees. The landscape saw is capable of cutting items having different thicknesses from thin vines to 8" thick tree limbs.

It shall be appreciated that the landscape saw depicted in embodiments of the invention comprise numerous advantages. In particular, the weight reduction of components such as worm gear 16 by the presence of cutout 74 greatly reduces the rotational mass of the saw. This reduction in weight enhances performance of the saw and reduces the amount of power required to drive the components. In addition, this weight reduction helps to eliminate imbalances of the rotating worm gear 16, which reduces vibration of components, thereby improving the durability of the landscape saw. Finally, the weight reduction of components minimizes user fatigue when using the landscape saw.

It shall be appreciated that the components of the dual blade landscape saw described in several embodiments herein may comprise any alternative known materials in the field and be of any color, size and/or dimensions. It shall be appreciated that the components of the dual blade landscape saw described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A dual reciprocating blade landscape saw with enhanced performance and reduced vibrations when in use, the landscape saw operably connected to a rotatable shaft of an input device, the landscape saw comprising;
    a worm assembly comprising a lower housing and a worm disposed therein, the worm operably connected to the rotatable shaft of the input device and comprising a spiral thread;
    a worm gear assembly operably connected to the worm assembly and comprising an upper housing and a worm gear disposed therein, the worm gear comprising a disk comprising a cutout and a plurality of outer teeth engaged with the spiral thread of the worm, the cutout comprising a pair of flared portions that extend from a central portion of the worm gear to an edge of the worm gear to reduce rotational mass; and
    a pair of blades coupled to opposing sides of the worm gear, wherein the rotatable shaft of the input device is configured to drive the worm of the worm assembly, wherein rotational motion of the worm transfers to the worm gear to permit the pair of blades coupled thereon to move linearly in a reciprocating sequence.

2. The landscape saw of claim 1, wherein the worm comprises a worm shaft disposed therethrough along a longitudinal axis of the worm, the worm assembly further comprising a pair of worm bearings and an adaptor, the pair of worm bearings disposed around the worm shaft on opposing ends of the worm, the adaptor being coupled to one of the ends of the worm shaft and the rotatable shaft of the input device.

3. The landscape saw of claim 2, further comprising a plug coupled to the lower housing and in contact with one of the pair of worm bearings.

4. The landscape saw of claim 3, wherein the worm gear assembly further comprises a pair of connecting rods comprising first ends coupled to opposing sides of the worm gear and second ends, each blade of the pair of blades coupled to the second end of one of the pair of connecting rods.

5. The landscape saw of claim 4, wherein each connecting rod in the pair of connecting rods comprises a first opening in the first end and a second opening in the second end.

6. The landscape saw of claim 5, wherein the worm gear assembly further comprises a pair of journal pins, a pair of journal bushings, and a pair of bearing journals, wherein the first bearing journal and first journal bushing are both disposed within the first opening in the first connecting rod and coupled to the worm gear by the first journal pin, wherein the second bearing journal and second journal bushing are both disposed within the first opening in the second connecting rod and coupled to the worm gear by the second journal pin.

7. The landscape saw of claim 6, further comprising a pair of blade carriers, a pair of blade carrier bushings and a pair of wrist pins, wherein the first carrier bushing and first wrist pin are disposed within the second opening in the first connecting rod with the first wrist pin extending through the first blade carrier coupled to the first blade of the pair of blades, wherein the second carrier bushing and second wrist pin are disposed within the second opening in the second connecting rod with the second wrist pin extending through the second blade carrier coupled to the second blade of the pair of blades.

8. The landscape saw of claim 7, wherein the worm gear assembly further comprises a pair of bearing carriers disposed within the upper housing and coupled to the pair of bearing journals, each bearing carrier comprising a protrusion with a worm gear bearing disposed thereon.

9. The landscape saw of claim 8, further comprising a pair of caps coupled to the upper housing and disposed over the pair of worm gear bearings.

10. The landscape saw of claim 9, further comprising a shim plate disposed between the pair of blades.

\* \* \* \* \*